United States Patent
Curreri (10) Patent No.: US 6,516,041 B1
(45) Date of Patent: Feb. 4, 2003

(54) METHOD AND APPARATUS TO ELIMINATE CONFIRMATION SWITCHES AND CHANNEL DEMULTIPLEXER FROM SOFT CONTROL MAN-MACHINE INTERFACE (MMI)

(75) Inventor: Jeffrey M. Curreri, S. Glastonbury, CT (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 125 days.

(21) Appl. No.: 09/679,508

(22) Filed: Oct. 5, 2000

Related U.S. Application Data (60) Provisional application No. 60/158,030, filed on Oct. 7, 1999.

(51) Int. Cl.[7] .................................. G21C 7/36
(52) U.S. Cl. .................. 376/217; 376/215; 376/216; 376/245; 376/259; 702/183; 702/185; 345/1; 345/2; 345/3; 340/524; 340/525; 340/517; 340/825.16; 340/825.17
(58) Field of Search ..................... 376/215, 216, 376/217, 245, 259; 702/183, 185; 345/1, 2, 3; 340/524, 525, 517, 825.16, 825.17

(56) References Cited

U.S. PATENT DOCUMENTS

| | | | | |
|---|---|---|---|---|
| 3,713,142 A | * | 1/1973 | Getchell | 340/505 |
| 4,120,028 A | * | 10/1978 | Membrino et al. | 345/1.1 |
| 4,270,185 A | * | 5/1981 | Cohen et al. | 340/506 |
| 4,937,581 A | * | 6/1990 | Baldwin et al. | 235/384 |
| 5,361,198 A | | 11/1994 | Harmon et al. | 364/188 |
| 5,517,188 A | * | 5/1996 | Carroll et al. | 340/10.52 |
| 5,537,126 A | * | 7/1996 | Kayser et al. | 340/5.91 |
| 5,748,495 A | * | 5/1998 | Arita et al. | 340/3.43 |
| 5,777,896 A | | 7/1998 | Arita et al. | 364/550 |
| 5,812,622 A | * | 9/1998 | Chang et al. | 345/1.1 |
| 5,859,885 A | | 1/1999 | Rusnica et al. | 376/259 |
| 6,335,722 B1 | * | 1/2002 | Tani et al. | 345/173 |

FOREIGN PATENT DOCUMENTS

| | | | |
|---|---|---|---|
| EP | 0340667 | * | 11/1989 |
| GB | 2275563 | * | 8/1994 |

\* cited by examiner

Primary Examiner—Michael J. Carone
Assistant Examiner—John Richardson (57) ABSTRACT

A method and apparatus for controlling components in a component control system in a nuclear power plant includes an image processing system and display processor (IPS-DP) for issuing an encrypted command for a selected component in a component command system (CCS) in the nuclear power plant; a soft controller for receiving the encrypted command and matching the command with the selected component in the CCS for issuing a control command to the selected component; and control channel gateway for receiving the encrypted command from the IPS-DP and soft controller, deciphering the encrypted command, and, if authenticated, issuing a control command for said selected component in the CCS. Security and isolation, while complying with applicable codes and regulations, are assured.

28 Claims, 5 Drawing Sheets

SOFT CONTROL ARCHITECTURE

METHOD AND APPARATUS TO ELIMINATE CONFIRMATION SWITCHES AND CHANNEL DEMULTIPLEXER FROM SOFT CONTROL MAN-MACHINE INTERFACE (MMI)

CROSS-REFERENCE TO RELATED APPLICATION

This application for this invention is related to and claims priority from U.S. Provisional Application No. 60/158,030, filed on Oct. 7, 1999 by the same inventor.

BACKGROUND OF THE INVENTION

1. Field of the Invention

This invention relates generally to control systems for nuclear reactor power generation systems. More particularly, this invention relates to such a control system that functionally isolates safety and non-safety controls by using a soft control design concept, thus eliminating confirmation switches and channel demultiplexers. Still more particularly, this invention relates to such a control system that improves the man-machine (MMI) interface while permitting use of data encryption for command control data received by a control channel gateway.

2. Brief Description of the Prior Art

Complex control schemes are in place for nuclear reactor power generation systems to prevent component failures that could lead to catastrophic failure. Such control schemes have as their design basis the use of a human operator controlling continuous and discrete control functions from a single display device cooperating with an associated information processing system (IPS) and cathode ray tube (CRT) or flat panel display (FPD) and a display processor (DP). In current systems, controllers are provided on each operator workstation and remote shutdown control panel. The controllers are linked to safety-related engineered safety features—component control system (ESF-CCS) or non-safety-related process—component controlled systems (P-CCS) by way of control channel gateways (CCGs). A priority interlock is incorporated in the CCG to block any effect from the controllers on the safety CCS when an ESF actuation is in progress.

The controller usually provides continuous display of all parameters being controlled as well as, in some cases, parameters of components associated with the component selected for control. To insure that an operator has all information necessary for optimal process control, a continuous display of all controlled parameters is provided. It has long been sought in this control art to improve the human factors and operator efficiency in the use of the controller, while reducing the amount of hardware and design necessary to implement the control functions, and while maintaining if not improving reliability.

In such systems, and from a human factors perspective, there are three steps required of the previous control design that incorporated confirmation switches to carry out a control function. The operator would first need to make a selection from the IPS display, then press a confirmation switch, and third, manipulate the selected component from the control display. For certain control actions, these steps proved to be very monotonous and time-consuming. Accordingly, it is an aim of those making improvements on nuclear power plant control systems to reduce the number of hardware controls, such as by reducing or eliminating the confirmation switches without sacrificing reliability or safety.

When considering hardware/software implementation in such systems, certain functionalities made the prior designs complex and costly to integrate. Moreover, the multiple hardware elements needed to implement the prior designs would result in a less reliable configuration. Additionally, every software-based element in the design added development time not only to simplify implementing the function, but also to support the tasks associated with software and related safety analysis. Thus, it is an aim in improving control designs to address these kinds of issues while maintaining a defensible design from a regulatory point of view.

Data security has long been a matter of interest in assessing the functionality and efficiency of nuclear power plant safety systems. While redundancy as a concept has often been used with probability and statistical analysis to ensure data security and system integrity, it is an overall aim of this invention to introduce the latest, most secure encryption technology to the optimized control design. For simplicity, when discussing prior efforts, the term "control", or the like, will be used, while when discussing this invention, the term "soft control" will be used as distinguishing nomenclature. Current control systems communicate with error detection protocols of various kinds that can be susceptible to undetected bit errors. Accordingly; it is expected that data encryption will provide a powerful tool to transmit data and to certify that data as received as accurate in nuclear power plant control systems of the type to which this invention is primarily, but not necessarily exclusively, aimed.

Improved designs must meet current codes and standards. IEEE 603–1991, "Criteria for Safety Systems for Nuclear Power Generating Stations," addresses specific minimum functional criteria required of safety related systems that have direct application for Power, Instrumentation and Control systems for use in a nuclear power plant (NPP) application. The single failure criterion of section 5.1 of the standard specifies that:

"The safety systems shall perform all safety functions for a design basis even in the present of 1) any single detectable failure within the safety systems concurrent with all identifiable but non-detectable failures."

This criterion is further clarified by stating that:

"The performance of a probability assessment of the safety systems may be used to demonstrate that certain postulated failures need not be considered in the application of the criterion. A probability assessment is intended to eliminate consideration of events and failures that are not credible."

IEEE Std. 352–1987 is cited as applicable guidance in the performance of the reliability analysis.

Additionally, IEEE 603, Section 5.6.3 states:

"The safety system design shall be such that credible failures in and consequential actions by other systems [which include non-safety systems] shall not prevent the safety systems from meeting the requirements [of the standard]".

Thus, under this section, the classification of equipment as part of a safety system is determined by establishing that the equipment is used for both safety and non-safety functions or that the equipment is used as an isolation device in the boundary of a safety system.

Prior systems often use confirmation switches as a security mechanism to ensure the accuracy of a control command. Such switches provided a "safety break" between the safety systems and the non-safety related MMI. No control commands could pass, in a typical prior system, to the control channel gateways unless specific confirmation and channel selection had occurred. Such a task proved inefficient. Accordingly, it is an aim of this invention to provide a component control system for a nuclear power plant that eliminates a need for confirmation switches and complex multiplexer arrangements.

BRIEF SUMMARY OF THE INVENTION

It is thus an overall object of this invention to provide a component control system for a nuclear reactor power generation system that eliminates a need for confirmation or channel selection switches, while maintaining compliance with codes, standards, and regulations.

It is another general object of this invention to provide such a control system that functionally isolates safety and non-safety controls by using a soft design concept.

It is still another general object of this invention to provide such a control system that features encryption of component control action commands with decryption at the control channel gateway level.

In its main aspect, the invention relates to a control system for a nuclear power plant, comprising: means, including an information processing system and display processor (IPS-DP), for issuing an encrypted command for a selected component in a component control system (CCS) in the nuclear power plant; means, including a soft controller, for receiving the encrypted command from the IPS-DP means, matching the encrypted command with the selected component in the CCS; and issuing a control command for the selected component; and means, including a control channel gateway, for receiving the encrypted command from the IPS-DP means and the soft controller, and deciphering the encrypted command and, if authenticated, issuing a control command for the selected component in said CCS. The IPS-DP and the soft controller are classified as non-safety components of the control system.

The IPS-DP includes a database of control components in the control system and their routing information, and includes means for providing an encrypted command key that contains at least one of an incremental value, origin information, and component routing data associated with the control components. The means for issuing an encrypted command further includes means for issuing an unencrypted object ID tag, the soft controller being responsive to the object ID tag to call up an associated component template. The issuance of an encrypted command is solely a function of the IPS-DP.

The soft controller maintains a set of display pages that acts as a plurality of control templates for generation of analog and discrete control commands for the selected component. Upon receiving a command key and an object ID tag from the IPS-DP, the soft controller associates the ID tag with a corresponding display page to permit an operator to take a desired action on a selected component. The soft controller includes a timeout capability wherin, if an operator takes no control action within a preset period, the control template is cleared from the display on the soft controller and the encrypted command key received from the IPS-DP is destroyed. It is a feature of the invention that the soft controller has no capability to provide encrypted command keys independent of the IPS-DP.

The control channel gateway is a safety control that deciphers data generated by the IPS-DP and the soft controller, to enable action of the selected component. Alternatively, the system includes a channel having a group controller and at least a loop controller, said channel being connected to the control channel gateway for receiving command signals for enabling said selected component when located in said channel.

It is a more specific feature of the invention that the encrypted command provided by the IPS-DP includes a data packet with routing, control and origin information for a single component, the data packet being deciphered by said control channel gateway, and that the encrypted command provided by the IPS-DP affects only a single component at a time, whereupon risk of command error is minimized. Preferably, the encrypted command for a selected command includes a sequence tag applied by the IPS-DP when the command key is issued, wherein the sequence tag identifies the validity of a command key according to its sequence.

In another aspect, the invention features a corresponding method for controlling components in a component control system (CCS) for a nuclear power plant, comprising the steps of: issuing an encrypted command for a selected component in a component command system (CCS) in the nuclear power plant from an image processing system and display processor (IPS-DP); receiving the encrypted command from the IPS-DP at a soft controller; matching the encrypted command with the selected component in the CCS; and issuing a control command for the selected component; receiving the encrypted command from the IPS-DP and the soft controller means at a control channel gateway, and deciphering the encrypted command and, if authenticated, issuing a control command for the selected component in said CCS. Additional method features for the invention are also disclosed and claimed.

DETAILED DESCRIPTION OF THE PREFERRED EMBODIMENTS

Figure 1:
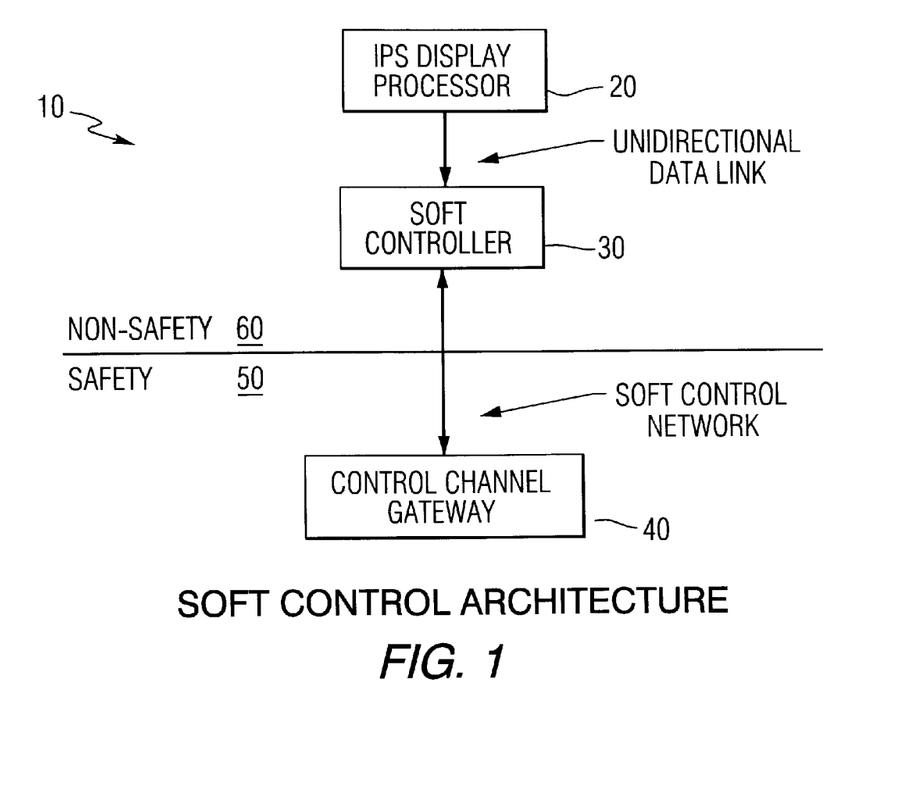
FIG. 1 is an architectural view of the optimized soft control concept of the component control system of the invention showing its three main elements for its design and functionality.

As shown in FIG. 1, the component control system according to the invention is shown generally by the reference numeral 10. The component control system includes an information processing system (IPS) display processor (DP) 20 and a soft controller 30, on the non-safety side 60 of the architecture, with a control channel gateway 50 on the safety side of the architecture. The safety side is referred to using the reference number 50, while the non-safety side is referred to using the reference numeral 60. The distinctions between non-safety and safety components in a nuclear power plant control system have been briefly discussed in the background of the invention above, and are understood by persons skilled in the nuclear power plant control art.

The information processing system (IPS) display processor (DP) 20 will now be discussed using its acronym IPS-DP 20. The IPS-DP 20 maintains a database of objects or control components in the control system and their respective network routing information throughout the safety control systems 50 and the non-safety control systems 60 of the nuclear power plant. Together the control systems are referred to as Component Control Systems (CCSs). According to the invention, the IPS-DP 20 issues encrypted command keys-in its data transmission that contain an incremental sequence value, origin information, and component routing data associated with the objects selected by the operation. The IPS-DP encrypts this data along with a CRC checksum to form an "encryption key". Together with the encrypted key, the IPS-DP 20 issues an unencrypted object ID tag used to call up the appropriate control template on the soft controller 30. The IPS-DP 20 is the only element of the soft control system according to the invention that supports the ability to perform data encryption. Data encryption solely as a function of the IPS-DP 20 will be discussed later in this specification.

The soft controller 30 is a diverse display processor and computer as compared to the IPS-DP 20. The soft controller 30 maintains no record of CCS components or their designated CCS locations. Rather, the soft controller 30 only maintains a set of display pages that act as control templates for the generation of analog and discrete control commands.

Upon receipt of an encryption key and object ID tag from the IPS-DP 20, the soft controller 30 associates the ID tag with the appropriate display page and presents the display page to the operator. The encryption key issued by the IPS-DP 20 is placed in an buffer that supports the storage ability for only one key at a time. The operator may then take the desired control action on the displayed object.

As each operator action is detected, the encrypted key, the object ID, the control command, and command sequence data are broadcast to the deterministic soft control network 42 within the CCGs 40. The operator may continue to take control action on the selected component for as long as necessary. If, after a preset period during which the operator takes no control action, the control template is cleared from the display and the encrypted key received from the IPS-DP 20 is destroyed. It is an important characteristic that the soft controller 30 has no capability to modify, in a usable form, or create encrypted keys. No functionality is provided within the soft controller 30 to encrypt or decrypt the encryption keys.

The control channel gateway (CCG) 40 is the ultimate receptor for all of the data generated by the EPS-DP 20 and the soft controller 30. The CCG 40 is a safety control component that deciphers and validates the data. A fundamental characteristic of the CCG 40 is that it is designed to act upon one command at a time. Each received data packet at the CCG 40 presents routing and control information for one object within its associated CCS channel. Therefore, when considering a potential for receipt of erroneous data, even if the erroneous data could be interpreted by the CCG 40 as a valid command, only one object in the CCS could potentially be affected by that data. Additional details on the CCG functionality and defenses against erroneous data are next presented.

A description is now provided of the applied defense in depth strategy where failure modes are detected and blocked at the lowest most secure level of the design. At the outset, the structure of the data that is presented to the CCGs 40 is essential to understanding and appreciating the security afforded by the optimized soft control concept. It is the series of requirements imposed by the CCG 40 on the data structure that ensure the isolation and security of the safety system.

The data encryption features incorporated in the CCG 40 provide a high degree of protection against randomly generated data streams being equated to valid control commands, as previously described. In additional, other features preclude an acceptance by the CCG of randomly generated commands. The first of the other features is that when a data packet is received, the CCG 40 first determines its ability to decrypt the command key. As mentioned earlier, only the CCG 40 associated with the channel of the selected object has this ability.

Once an authenticated encryption key is received, the next operation performed by the CCG 40 as a safety component evaluate the previously encrypted data against the CRC checksum stored in the packet when it originated in the IPS-DP. If the checksum cannot be validated the data is discarded. If the CRC is validated next the CCG will determine if the control command attached by the soft control processor matches the channel and object ID tag of the command key. If no match is determined, a validation error is generated. If validation errors are determined in the prior steps by the CCG this condition may be to indicate an invalid command alarm, and the command data is discarded.

On the other hand, if the data is determined to be a match, the CCG 40 will next examine the sequence tag applied by the IPS-DP 20 when the key was issued. If this incremental sequence value is higher than the one contained in the previous validated command key received from the originating IPS-DP, the command key is considered valid to perform the command action. If the sequence value is equal to the previous value received, then an evaluation of the control command is performed to determine if the operation change requested differs from the previous command. If so, the command is forwarded to the CCS to perform the action.

A sequence tag may also be incorporated in the control command to validate that the commands are received in the sequence that the commands were issued. This assures that the commands are not of random origin. An alarm can be initiated if either sequence tag is determined to be random or out of sequence.

These functional features of the CCG 40 require very specific and deliberate combinations of data in order to perform any control action at the component control system (CCS) level. The security and isolation that can be demonstrated by the CCG 40 is sufficient to establish a defense against any credible failure mode that can be associated with the upstream soft controller 30 and the IPS processors of the IPS-DP 20. A certain functionality is required of the IPS-DP 20 and the soft controller 30 to satisfy the CCG 40 in order to perform a control action. Thus, the security and isolation sought is primarily achieved by the functionality of the CCG 40.

Figure 2:
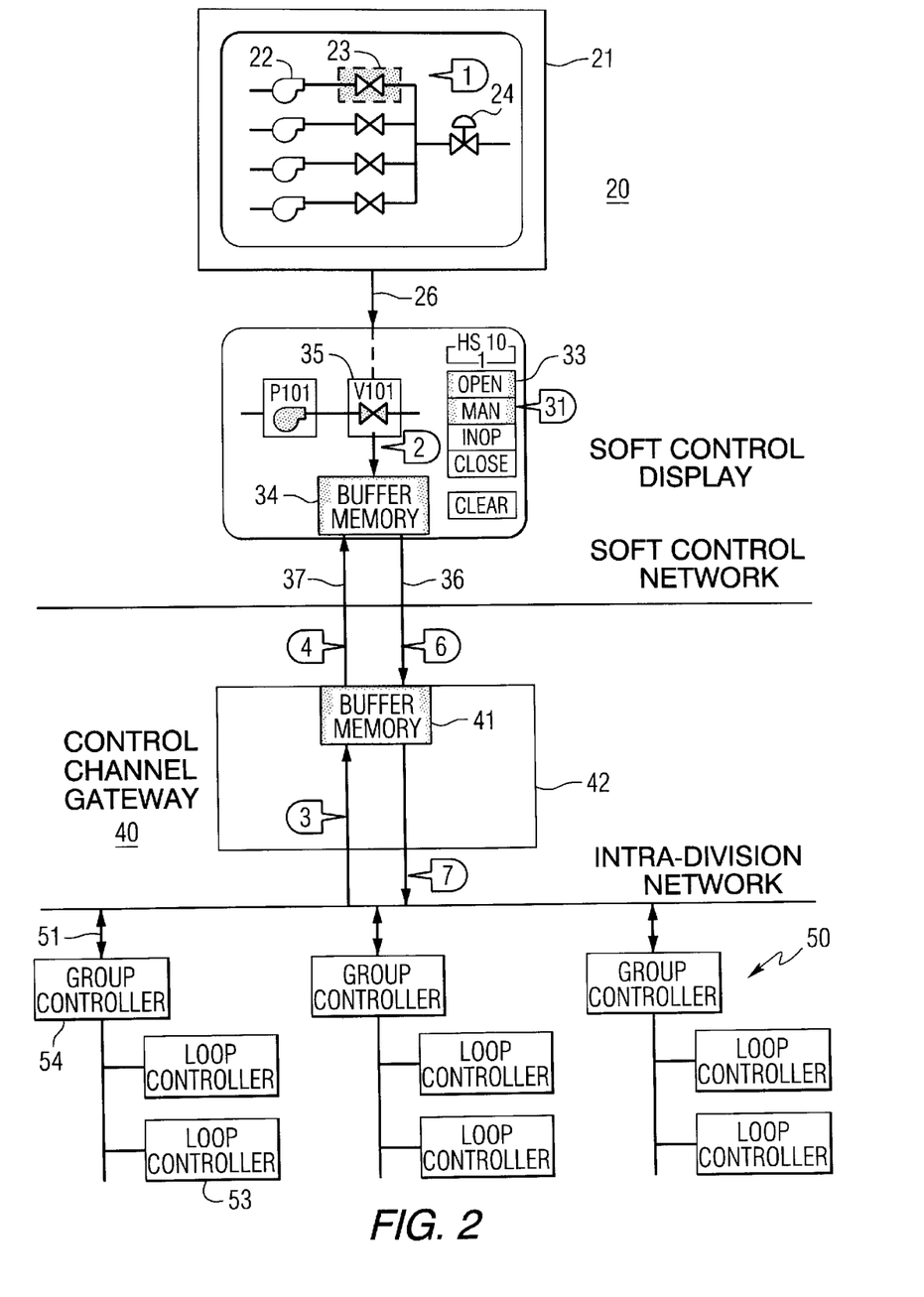
FIG. 2 is a more detailed block diagram of the invention shown in FIG. 1.

FIG. 2 shows a more detailed block diagram of the soft control feature of the component control system of FIG. 1. As seen in FIG. 2, for a representative example in which the IPS-DP 20 is an information CRT display 21 displaying a representative plurality of pumps 22, valves 23, and a shutoff valve 24. As shown, the operator has isolated a valve 23 as an object for control action, as shown in the shaded portion of the display 21.

The following is a discussion of a series of steps comprising the soft control operation when an icon of the valve 23 is selected by an operator of the IPS-DP 20. It should be remembered that the communications link between the IPS-DP 20 and the Soft Controller 30 is unilateral, at the connection 26 so that only a data signal containing the encryption key representative of the identified component, in this case the valve 23, is sent to the soft controller.

First, when the operator selects the symbol or icon of a component, such as the valve 23, on the panel display of the IPS-DP 20 by a trackball or manual touch, for example, the selected component, i.e. the valve 23, is identified. Then, information displayed directly above the icon (not shown) sends the component ID and the associated encryption data packet to the soft controller 30. As previously described, only the IPS-DP 20 has a capability of assigning an encryption code to the data packet for the component ID. The encryption technique may be any one of a number of commercially available encryption systems having a digital or analogue encryption code that is capable of being deciphered or read by the CCG 40 when added to a component ID for a component, such as a valve 23.

Second, after the soft controller 30 receives the component ID from the display panel 20, the soft controller 30 compares the component ID 23 to a lookup table in the soft controller 30 and displays the corresponding control template 33 on the soft control display 31.

Third, the encryption data packet is loaded to the buffer memory 34 in the soft controller 30.

Fourth, when the soft control display 31 presents the appropriate control display page 35, in this case an icon of the valve 23, the soft controller 30 displays the component related status information from the control channel gateway 40. The component related status includes the current status of the component, an output the set point of the component, and the like. The information is transferred by way of a channel 37 to a buffer memory 41 in the control channel gateway 40.

Fifth, the component related information in step four above is then displayed dynamically, or on line, on a display on the Soft Controller 30.

Sixth, the operator then selects a control action at the soft controller 30. Typical examples of action requested for the valve 23 in circuit with the pump 22 are: an on/off action; a raise/lower action, such as raising or lowering the output or rpm of the pump; an increase/decrease action, such as increasing or decreasing the volume output of the pump, or increasing or decreasing the rpm of the pump; an automatic/manual control for the valve and pump, and the like.

Seventh, the selected control command for the control action selected in Step Six above is then placed in an output buffer of the buffer memory 34 of the soft controller by connection over the channel 37. The output buffer 34 supports the storage ability for only a single encryption key packet and one control command at a time. It will later be discussed how the encryption data and control command are concatenated to provide a complete instruction.

Figure 4A:
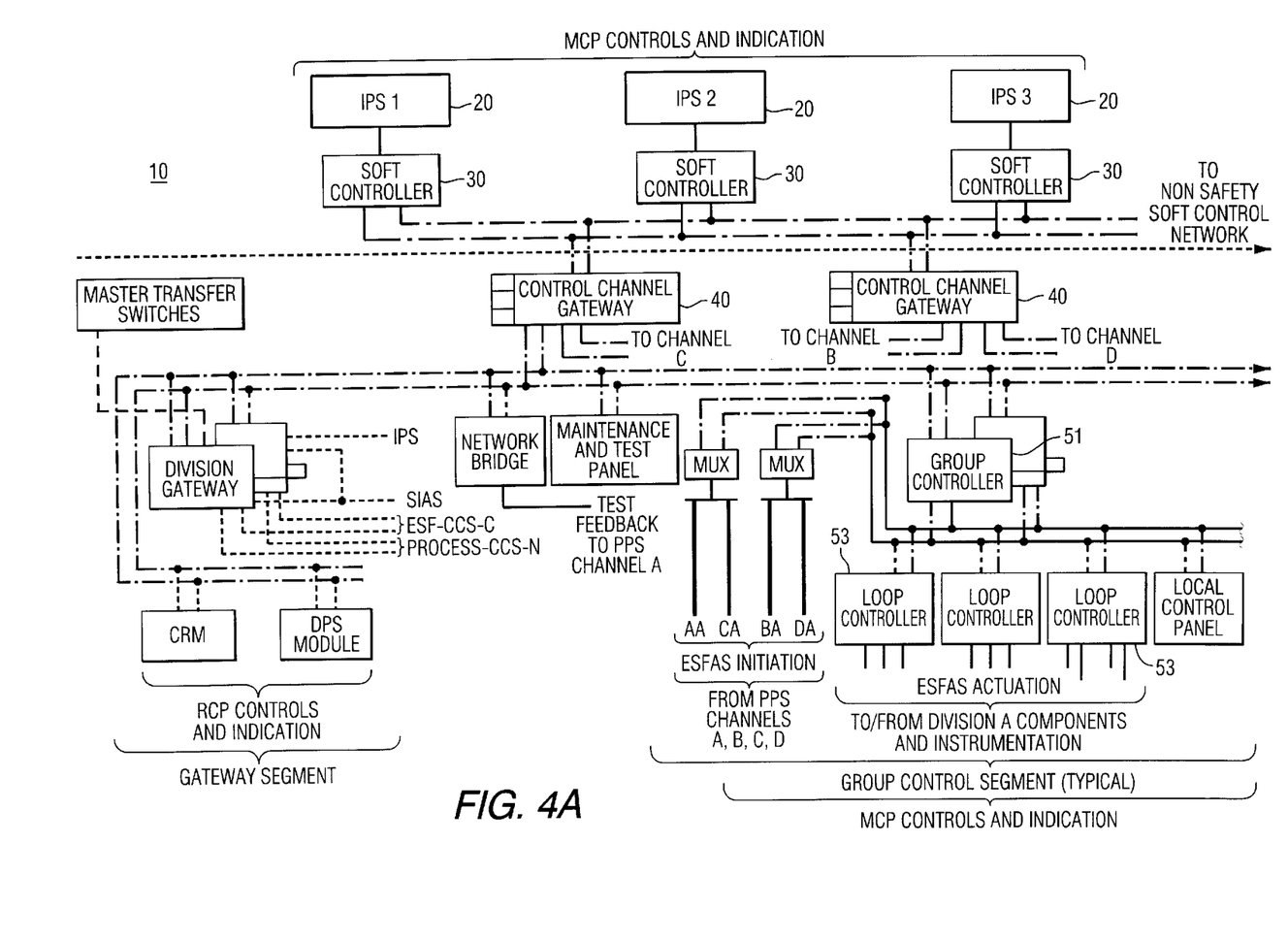
FIGS. 4A, 4B is a detailed wiring diagram and division block diagram of a representative preferred embodiment of the component control system of the invention.
Figure 4B:
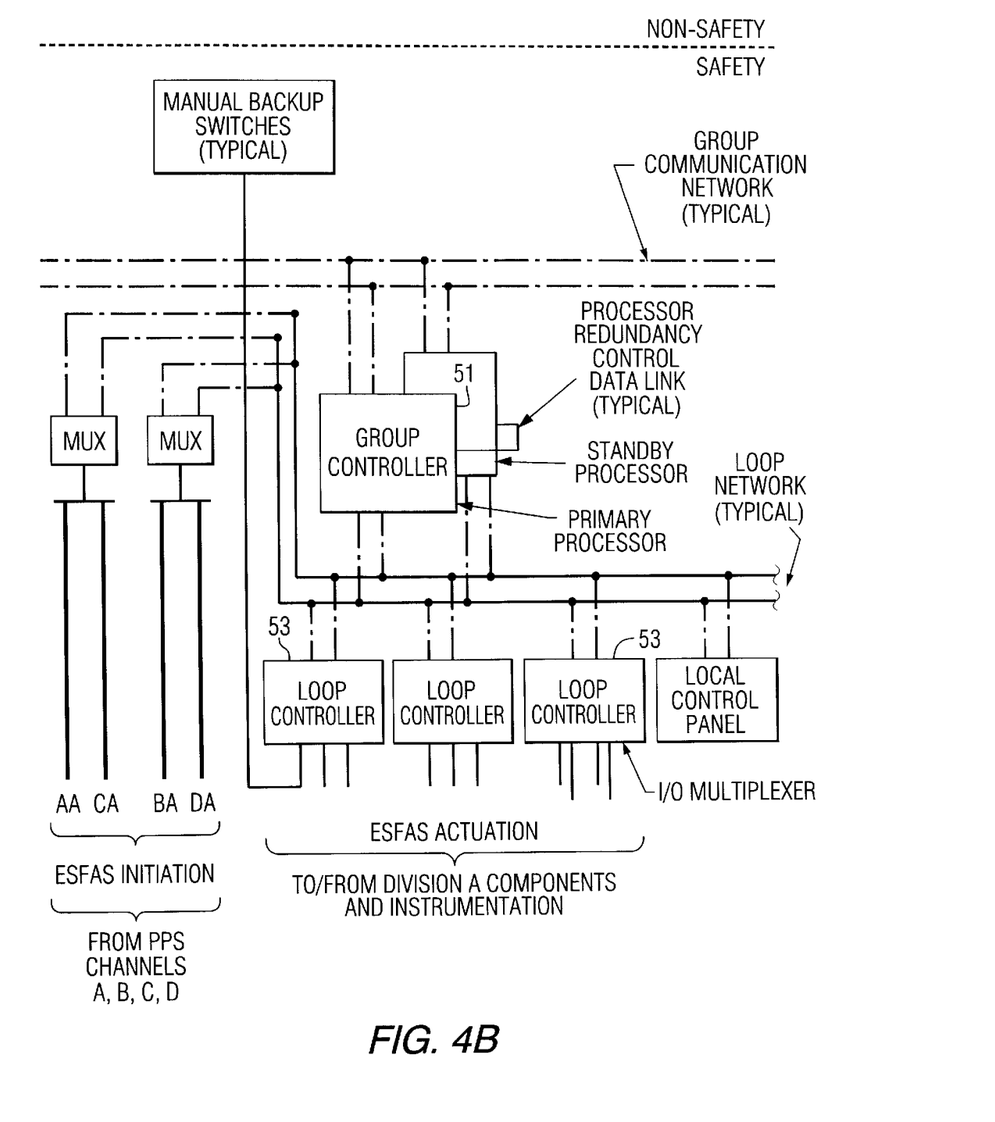

Eighth, the control channel gateway 40 receives the encryption key packet from the soft controller over the channel 36, along with the control command and the control channel gateway 40 deciphers the encryption data packet. After a check of data validity between deciphering data and the control command, A component control command is issued by the control channel gateway and is transmitted over the channel 43 to the appropriate component control circuit in an appropriate loop controller as a subsystem of an appropriate group controller in the system control matrix 50. More specifically, the component control command by the control channel gateway 40 is transmitted by a communication channel 51 to the component control circuit 52 (see FIG. 4) in the loop controller 53 for the group controller 54.

Ninth, the related component in the field is then actuated. In the example being followed ed, the valve 23 associated with the pump 22 is actuated ed according to the verified control command given. Fee back information is sent back from the matrix 50 to the soft controller 30 through the control channel gateway 40.

Tenth, in addition, this information is sent back to the IPS-DP 20 through a division gateway.

Eleventh, the IPS-DP 20 then sends the feedback information to then information flat panel display, acting as a part of the IPS-DP 20. Thereby, the operator can cross-check this information using the plant information display or the soft controller 30.

In the introduction to this specification, the requirements were discussed that a nuclear power plant control conform to the requirements of IDD 603–1991 and IEEE 7.4.3.2 and be defensible for licensing. The advantages of the system according to the invention with respect to these requirements will now be discussed.

As previously noted, in order to meet the requirements of these sections, it is necessary to incorporate some method that would provide functional isolation to maintain the independence of the safety and non-safety equipment and prevent the non-safety equipment from impacting the safety function. Functional isolation among the elements or nodes attached through the soft control network 20, 30 is established by the coding and encryption method employed to the data transmitted. Each of a plurality of control channels is the receiver of the encrypted data on the soft control network via the control channel gateways 40. The notion that a plurality of control channels can be used with a corresponding, or lesser number of control channel gateways is later discussed with respect to FIG. 4.

Moreover, as to support for the isolation functionality noted immediately above, each of the control channel gateways 40 also present component status and parameter data onto the soft control network 20, 30 for presentation on the soft control displays 31. In addition, the requirement of IEEE 7-4.3.2 that some method be employed to buffer data transfers between safety and non-safety channels is met by noting again that the IPS-DP 20 and the soft controller are non-safety systems, as noted by the reference numeral 40 in FIG. 1, while the control channel gateway is a safety system as noted by the reference numeral 50 in FIG. 1.

Since both the soft controllers 30 and the associated soft control network are to be classified as non-safety, the requirements of IEEE 7-4.3.2 are considered applicable where these devices are to communicate with the safety related channels. In order to satisfy these requirements, the configuration according to the invention have buffers and route data to their designated channels. As thus noted, these computers are the control channel gateways 30. Preferably, as opposed to having common control channel gateways 30 shared between channels, a more conservative approach is employed using one CCG 30 per channel. Alternatives with respect to the number of control channel gateways and number of channels will be further briefly discussed in connection with FIG. 4.

Figure 3:
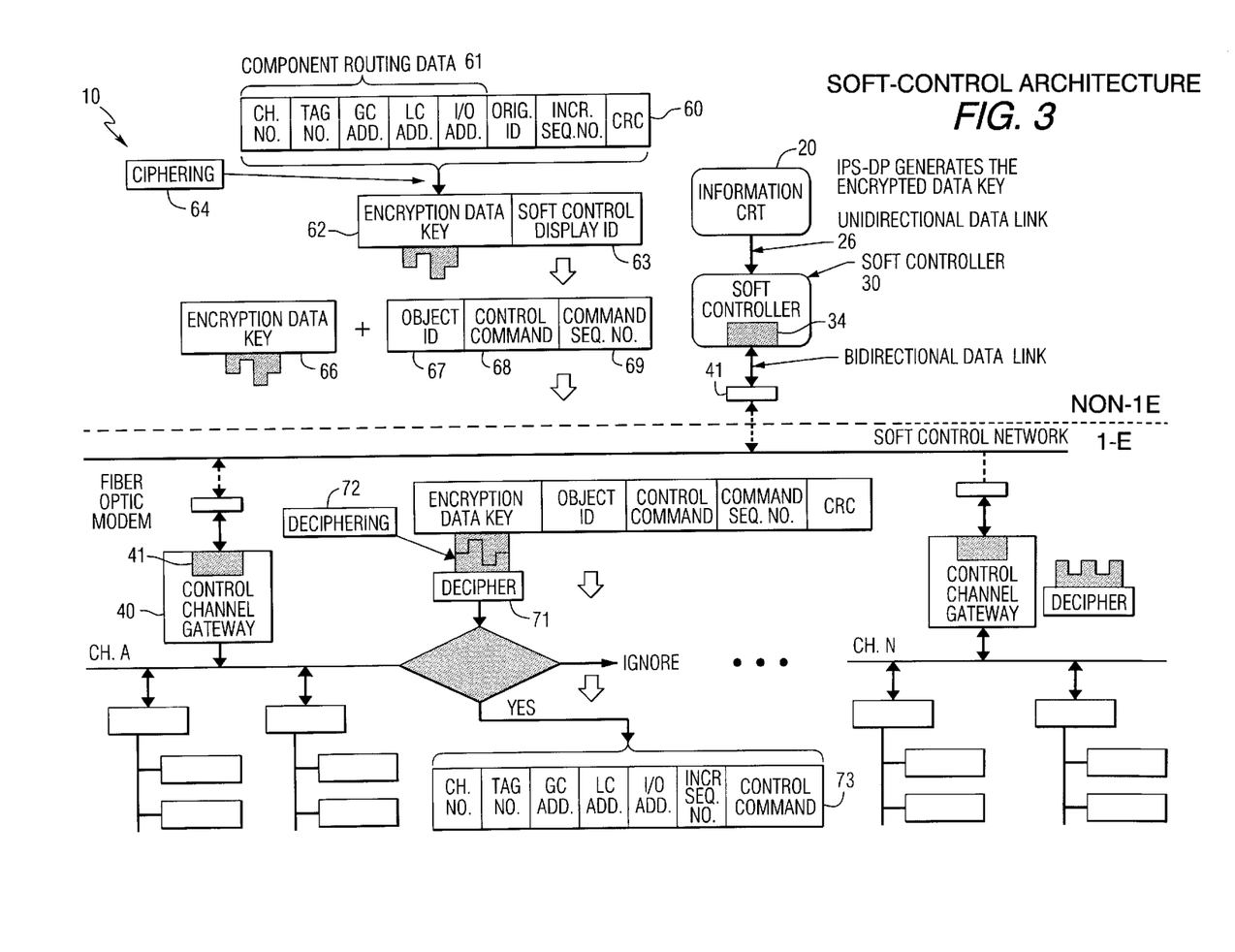
FIG. 3 is a still more detailed block diagram of the invention shown in FIGS. 1 and 2.

Data encryption and deciphering is next discussed with respect to FIG. 3. To reiterate, the data encryption technology ensures with a high degree of confidence that the data utilized by the control channel gateway 40 for routing command information to the CCS is accurate and secure. Unlike conventional communication error detection protocols that can be susceptible to undetected bit errors, data encryption provides a secure means to transmit data as well as provides a means wherein the received data can be certified as accurate by the control channel gateway 40. The upper portion of FIG. 4 shows in a highly diagrammatic and representative fashion for the non-safety features shown above the dotted line the encryption features of the invention. At the upper right hand portion of the drawing, a reiteration of the functionality of the control system according to the invention. Specifically, the ISP-DS 20 generates the encrypted data key that is passed via a unilateral data link 26 (see FIG. 2) to the soft controller 30. The soft controller 30 generates the control command that is stored in the buffer memory 34. The control command is passed from the buffer memory 34 to a buffer memory 41 in the control channel gateway. This abbreviated tabular presentation makes it easy to study the encryption scheme.

The block 60 generated only by the IPS-DP 20 contains the encrypted data packets containing the applicable routing information for the selected display object, such as the valve 23 and pump 22 combination shown in FIG. 2. The component routing data is representatively shown in FIG. 3 as a significant portion of the block 60 at the combination of blocks 61 labeled CH NO., TAG NO., GC ADD, LC ADD, I/O ADD, and CRC. These are generally referred to as the "encryption key". Respectively., these blocks contain addresses for the channel number, the "tag number" for the component, the group controller address, the loop controller address, and an input/out address. An important feature of the invention, therefore, as has been stated, is that only the IPS-DP maintains the database of information necessary to compile the routing data as well as the encryption used for each CCS channel thereby further enhancing security since the data is not vulnerable to routing errors as it is distributed to the CCGs 40. The diversity of hardware between the IPS-DP and the Soft Controller further ensures that single failures within the configuration cannot generate valid control commands which can effect more than a single component within a single CCS channel.

The encrypted key 61 is linked together with additional commands representatively identified as ORIG ID, INCR.SEQ.NO. and CRC to complete the command block 60.

As shown, the data in the command block 60 in subjected to a step of ciphering 64 to produce an encrypted data key 62 together with a soft control display ID 63. As shown in the next adjacent lower block, the command components are thus easily grouped as an encryption data key 66 plus an object ID 67, a control command 68, and a command sequence number 69.

The encrypted data that originated in the IPS-DP can only be decrypted or deciphered by the control channel gateway 40 of the channel in which the selected component, i.e., the valve 23 and its associated pump 22, is located. Only the CCG 40 of that channel has the matching decryption key necessary to decipher the data back to a form in which the component routing information can be utilized. A portion of this feature is shown by the appendages to the blocks 62 and 66 that are matched with the appendages to the decipher block 71 in the lower portion of FIG. 3. To the lower left of FIG. 3 is shown is representatively shown the buffer memory 41 for a control channel gateway 40 as previously discussed relating to a plurality of group controllers 51, each associated with a plurality of loop controllers 53.

After the data is subjected to the deciphering step 72, the result is interrogated for a match. If there is a match, the control gateway 40 passes the operative component routing data 61 with a control command 73. A plurality of N channels is representative shown as a part of the soft control network.

To further enhance the ability to ensure and verify the integrity of the decrypted data, traditional CRC algorithms are also employed to ensure the resulting data matches the form of its original transmission. For this purpose, a cyclic redundancy check (CRC) value is imbedded in the data origination point and is encoded along with the routing information, the integrity of the decrypted data arrived at the CCG being determined with a high degree of certainty.

The data encryption scheme provides a high degree of protection against randomly generated data streams being equated to valid control commands. The CCG 40 also has a number of other features to preclude its acceptance of randomly generated commands. First, when a data packet is received, the CCG 40 determines its ability to decrypt the command key. As mentioned above, only the CCG 40 for a particular channel associated with the selected component has this ability. That CCG 40 applies its unique code or "cipher" to the encrypted portion of the data. The result of this operation yields a series of data that equates the original of the data as well as the CCS routing information associated with the selected object. These data are shown in the If the decrypted data cannot be verified as authentic, it is discarded and shown by the interrogation 74 in FIG. 3.

An example of the code received at the control channel gateway 40 is shown by the block 76 including, in addition to encryption data as discussed, an object ID, a control command, a command sequence number (discussed later) and a CRC, as noted before and briefly discussed later.

Once an authenticated command key is received, the next operation performed by the CCG 40 is to determine if the control command 73 attached by the soft control processor 30 matches the channel and object ID tag of the command key. If these do not match, a validation error is generated that may be used for invalid alarming purposes (not shown) and the command is discarded. If the data is determined to be a match, the CCG will next examine the sequence tag applied by the IPS when the key was issued. If this incremental sequence value is higher than the one contained in the previous validated command key received, the command key is considered to be valid to perform the command action.

If the sequence value is equal to the previous value received, then an evaluation of the control command is performed to determine if the operational exchange requested differs from the previous command. If so, the command is forwarded to the CCS to perform the action sought. A sequence tag, shown in either block 73 or block 76, may also be incorporated in the control command to validate that the commands are received in the sequence they were issued. This further assures that they are not of random origin or out of sequence.

As described above the security and isolation required is achieved by the functionality of the CCG. However, as still an additional measure, the IPS-DP 20 may issue a "test key" to the soft controller 30 on a periodic basis If the test key should ever be received by the CCG 40 this would indicate a failure in the Soft Controller since only component control commands are allowed to pass from the soft controller to the CCG, If this condition exists an error condition will be alarmed.

A safety computer for typical nuclear control systems, referred to in this art as an ESF-CCS, is able to override the non-safety soft controller 30 when the safety system is performing its safety function. This priority interlock is used to block any effect on the ESFAS component control from the soft controller 30 during safety function performance. Other safety functions normal to a typical nuclear control system are also unaffected. For example, the ESFAS (Emergency Safety Features Actuation System) signals from the PPS can override soft controller signals are any thine;

actuation signals from class 1E fixed position controls can also override the component actuation from the soft controller 30, and the control signals from the soft controller are assigned the lower priority.

FIG. 4 (taken from FIG. 6 of the Provisional Application) shows a representative example of the component control system according to the invention in a block diagram form. In this representative example, three soft controllers 30 are servicing two control channel gateways 40 for services four channels to which data can be directed. FIG. 4 thus shows that the component control system according to the invention can be incorporated into a conventional nuclear safety control system quite easily. The remaining components of FIG. 4 are not particularly relevant to the component control-system according to the invention. Reference may also be made to FIGS. 1 through 5 of the corresponding Provisional Application for additional alternatives to the relative numbers of IPS-DPs 20, soft controllers 30, control channel gateways 40, and channels n for operating systems.

The preferred embodiment for this invention is discussed in conjunction with a current DCS platform for a control system. If another nuclear control system is used, the invention may be modified to work satisfactorily with that system. For example, if the network of group controllers and loop controllers were not used, then an input/output system would be used to operate the components if all of the encryption and identification parameters were satisfied.

To summarize, the features of the component control system according to the invention include: (10 data encryption technology employed in the IPS-DS display processor 20 only, and is used to generate secure CCS component routing packets; component control commands are only generated by the soft controller 30; the soft controller 30 limits receipt of and storage of command keys to one per time; the soft controller maintains no ability to encrypt or decrypt component routing data packets; each encrypted data packet can only be deciphered or decrypted by the control channel gateway 40 in the destination CCS channel; CRCs are embedded in the encrypted data packet to verify that the decrypted packet has not been somehow modified or corrupted; and sequence tags generated by the IPS 20 and the soft controller 30 allow the CCG 40 to validate that the command processing is not random.

Other features of the invention will become apparent to those skilled in the art, but the invention is not limited only to this description. Rather, the invention is measured only by the appended claims.

What is claimed is:

1. A control system for a nuclear power plant, comprising:
    means, including an information processing system and display processor (IPS-DP), for issuing an encrypted command for a selected component in a component control system (CCS) in the nuclear power plant;
    means, including a soft controller having no capability to create encryption keys independent of said IPS-DP, for receiving said encrypted command form said IPS-DP means, matching said encrypted command with said selected component in the CCS; and issuing a control command for said selected component; and
    means, including a control channel gateway, for receiving said encrypted command from said IPS-DP means and said soft controller, and deciphering said encrypted command and, if authenticated, issuing a control command for said selected component in said CCS.

2. The control system as set forth in claim 1, wherein said IPS-DP and said soft controller are classified as non-safety components of said control system.

3. The control system as set forth in claim 1 wherein said IPS-DP includes a database of control components in the control system and routing information for said control components.

4. The control system as set forth in claim 1, wherein said means for issuing provides an encrypted command key that contains at least one of an incremental value, origin information, and component routing data associated with the control components.

5. The control system as set forth in claim 1, wherein said means for issuing an encrypted command further includes means for issuing an unencrypted object ID tag, said soft controller being responsive to the object ID tag to call up an associated component template.

6. The control system as set forth in claim 1, wherein said means for issuing an encrypted command is solely a function of the IPS-DP.

7. The control system as set forth in claim 1, wherein said soft controller maintains a set of display pages that act as control templates for generation of analog and discrete control commands for the selected component.

8. The control system as set forth in claim 5, wherein said soft controller, upon receiving a command key and an object ID tag from the IPS-DP associates the object ID tag with a corresponding display page to permit an operator to take a desired action on said selected component.

9. The control system as set forth in claim 5, wherein said soft controller includes a timeout capability wherein, if an operator takes no control action within a preset period, the control template is cleared from the display on the soft controller and the encrypted command key received from the IPS-DP is destroyed.

10. The control system as set forth in claim 1 wherein said control channel gateway is a safety control that deciphers data generated by the IPS-DP and the soft controller, to enable action of said selected component.

11. The control system as set forth in claim 1, further including a channel having a group controller and at least a loop controller, said channel being connected to said control channel gateway for receiving command signals for enabling said selected component when located in said channel.

12. The control system as set forth in claim 1, wherein said encrypted command provided by said IPS-DP includes a data-packet with routing, control and origin information for a single component, said data packet being deciphered by said control channel gateway.

13. The control system as set forth in claim 1, wherein said encrypted command provided by said IPS-DP affects only a single component at a time, whereupon risk of command error is minimized.

14. The control system as set forth in claim 1, wherein said encrypted command for a selected command includes a sequence tag applied by the IPS-DP when the command key is issued, wherein said sequence tag identifies the validity of a command key according to the sequence of said selected command.

15. A method for controlling components in a component control system (CCS) for a nuclear power plant, comprising the steps of:
    issuing an encrypted command for a selected component in a component control system (CCS) in the nuclear power plant from an information processing system and display processor (IPS-DP);
    receiving said encrypted command from said IPS-DP means at a soft controller having no capability to provide encrypted command keys independent of said IPS-DP, matching said encrypted command with said selected component in the CCS; and issuing a control command for said selected component;

receiving said encrypted command from said IPS-DP means and said soft controller at a control channel gateway, and deciphering said encrypted command and, if authenticated, issuing a control command for said selected component in said CCS.

16. The method of controlling components in a component control system as set forth in claim 15, wherein said IPS-DP and said soft controller are classified as non-safety components of said control system.

17. The method of controlling components in a component control system as set forth in claim 15 wherein said IPS-DP includes a database of control components in the control system and routing information for said control components.

18. The method of controlling components in a component control system as set forth in claim 15, wherein said step of issuing includes issuing an encrypted command keys that contain at least one of an incremental value, origin information, and component routing data associated with the selected control component.

19. The method of controlling components in a component control system as set forth in claim 15, wherein said step of issuing includes issuing an encrypted command and issuing an unencrypted object ID tag, said soft controller being responsive to the object ID tag to call up an associated component template.

20. The method of controlling components in a component control system as set forth in claim 15, wherein said step of issuing an encrypted command is solely a function of the IPS-DP.

21. The method of controlling a component in a component control system as set forth in claim 20, wherein said soft controller maintains a set of display pages that act as control templates for generation of analog and discrete control commands for the selected component.

22. The method of controlling a component in a component control system as set forth in claim 21, wherein said soft controller, upon receiving a command key and an object ID tag from the IPS-DP associates the object ID tag with a corresponding display page to permit an operator to take a desired action.

23. The method of controlling a component in a component control system as set forth in claim 15, wherein said soft controller includes a timeout capability wherein, if an operator takes no control action within a preset period, the control template is cleared from the display on the soft controller and the encrypted command key received from the IPS-DP is destroyed.

24. The method of controlling components in a component control system as set forth in claim 15 wherein said control channel gateway is a safety control that deciphers data generated by the IPS-DP and the soft controller, to enable action of said selected component.

25. The method of controlling components in a component control system as set forth in claim 15, further including a channel having a group controller and at least a loop controller, said channel being connected to said control channel gateway for receiving command signals for enabling said selected component when located in said channel.

26. The method of controlling components in a component control system as set forth in claim 15, wherein said encrypted command provided by said IPS-DP includes a data packet with routing, control and origin information for a single component, said data packet being deciphered by said control channel gateway.

27. The method of controlling components in a component control system as set forth in claim 15, wherein said encrypted command provided by said IPS-DP affects only a single component at a time, whereupon risk of command error is minimized.

28. The method of controlling components in a component control system as set forth in claim 15, wherein said encrypted command for a selected command includes a sequence tag applied by the IPS-DP when the command key is issued, wherein said sequence tag identifies the validity of a command key according to its sequence.

* * * * *